United States Patent

McMurtry et al.

[11] Patent Number: 5,270,664
[45] Date of Patent: Dec. 14, 1993

[54] PROBE FOR MEASURING SURFACE ROUGHNESS BY SENSING FRINGE FIELD CAPACITANCE EFFECTS

[75] Inventors: David R. McMurtry, Wotton-Under-Edge; David K. Thomas, Stinchcombe, both of United Kingdom

[73] Assignee: Renishaw, plc, Wotton-Under-Edge, United Kingdom

[21] Appl. No.: 857,939

[22] PCT Filed: Oct. 2, 1991

[86] PCT No.: PCT/GB91/01704
§ 371 Date: May 19, 1992
§ 102(e) Date: May 19, 1992

[87] PCT Pub. No.: WO92/06351
PCT Pub. Date: Apr. 16, 1992

[30] Foreign Application Priority Data

Oct. 3, 1990 [GB] United Kingdom ............... 9021448

[51] Int. Cl.⁵ ................... G01R 27/26; G01B 7/34
[52] U.S. Cl. ......................... 324/690; 324/158 P; 324/662; 324/687
[58] Field of Search ............ 324/662, 663, 671, 686, 324/687, 688, 690, 158 P

[56] References Cited

U.S. PATENT DOCUMENTS

| | | | |
|---|---|---|---|
| 3,400,331 | 9/1968 | Harris et al. | 324/690 |
| 4,153,998 | 5/1979 | McMurtry | 324/687 |
| 4,311,959 | 1/1982 | Riessland et al. | 324/662 |
| 4,347,478 | 8/1982 | Heerens et al. | 324/688 X |
| 4,423,373 | 12/1982 | LeCroy, Jr. | 324/158 P X |
| 4,814,691 | 3/1989 | Garbini et al. | |
| 4,996,492 | 2/1991 | Anderson et al. | 324/687 |

FOREIGN PATENT DOCUMENTS

| | | |
|---|---|---|
| 0067643 | 12/1982 | European Pat. Off. |
| 0425823 | 5/1991 | European Pat. Off. |
| WO92/04593 | 3/1992 | PCT Int'l Appl. ........... 324/662 |

*Primary Examiner*—Gerard R. Strecker
*Assistant Examiner*—Diep Do
*Attorney, Agent, or Firm*—Oliff & Berridge

[57] ABSTRACT

A capacitance sensing probe is disclosed for taking measurements of features on a workpiece surface. The probe has two electrodes ($E_1$, $E_2$) spaced apart in the direction of movement of the probe with the electrodes being disposed in an attitude normal to the surface. Only the edge of the electrodes are exposed to the surface and an electric circuit (EC) is provided for determining the effect of the surface on the fringe field capacitance between the electrodes. Guard electrodes are used to reduce the stray capacitance being measured. Various embodiments are shown with different numbers and arrangements of electrodes.

8 Claims, 6 Drawing Sheets

PROBE FOR MEASURING SURFACE ROUGHNESS BY SENSING FRINGE FIELD CAPACITANCE EFFECTS

The present invention relates to a capacitance sensing probe for making measurements of the distance between the probe and a surface. In particular, the probe is used to make measurements of the roughness of the surface being measured.

It is known for example from U.S. Pat. No 4,814,691 to measure the profile of a surface using a capacitance probe, in which the distance between a single electrode of the probe and the surface is determined by measuring the capacitance between the electrode and the surface at any given point as the probe is moved over the surface. The probe described includes a thin flat-plate electrode which is mounted in the probe with its edge flush with the end of the probe and a determination is made of the variation of the fringe-field capacitance between the probe and the surface.

While such probes give satisfactory results they are limited in amount of information about the surface which they can provide in a single pass across the surface.

This deficiency of the known probes is overcome with a probe as claimed in the appended claims by providing two electrodes in the probe which are spaced apart in the direction of the intended movement of the probe with insulation therebetween, and by measuring the fringe field capacitance between the electrodes and the effect the surface has on this capacitance By using the principle of measuring the change of fringe-field capacitance between a pair of plates the probe designer has greater flexibility in the probe design. The probe is basically an integrating device which determines a capacitance which is related to the average of the distances of the electrodes from the surface over an area.

By choosing different spacings between the electrodes the size of the area over which the probe will average can be changed. Thus a range of probes of different sensitivities can be made for a variety of jobs.

In addition, by measuring the fringe field capacitance between each electrode and the surface at the same time, information can be derived about the local slope of the surface at the point of measurement.

In a preferred form of the invention the two electrodes each take the form of a very thin layer applied to internal surfaces of parts of the stylus by sputtering or vapour deposition, and the two parts are firmly connected together with the electrodes confronting each other and a very thin layer of insulation between them.

By this means the area of surface over which the capacitance is averaged becomes small enough that the probe will detect individual peaks and troughs of the surface roughness and effectively acts as a device for measuring a surface profile having a high spatial frequency variation.

Increasing the spacing of the electrodes increases the fringe-field and gives the probe greater sensitivity thus enabling the electrode to be mounted at a greater distance from the surface. However the spatial frequency which can be detected will decrease as the spacing of the electrodes increases. This means that greater variations in the distance between the electrode and the surface can be measured i.e greater roughness in the surface, but only at lower frequencies.

There is therefore an optimum spacing for the electrodes for any given measurement task.

In another embodiment of the invention the stylus terminates in a rounded skid within which the electrodes are mounted with their edges adjacent to, but spaced a small fixed distance from the surface of the skid.

By this means the skid can be passed over a workpiece surface in contact therewith and the skid will keep the electrode a constant distance from the surface. The skid will thus follow the low frequency variations in the surface profile and eliminate them allowing the probe to measure the higher frequencies only.

The probe may be mounted on a co-ordinate measuring machine (CMM) for providing movement thereof over the surface being measured. The machine may be provided with a servo control system to raise or lower the probe relative to the surface responsive to the capacitance measurement increasing or decreasing respectively so that shapes of workpieces, as well as surface profiles, can be measured.

Also to avoid damage to the probe should contact be made with the work-piece, the stylus may be mounted on a kinematic crash protection device for example as described in our U.S. Pat. No. 4,153,998.

In a further embodiment of the invention more than two electrodes may be used all spaced apart in the same direction.

The invention also includes a method of using the novel probe of the present invention which comprises the steps of orienting the probe so that the edges of the electrodes are normal to the surface, bringing the electrodes and the surface to be measured into close proximity, and moving the probe over the surface in a direction normal to the electrodes while measuring the capacitance between the electrodes and the effect of the surface on the fringe field capacitance thereof.

The method and apparatus of the present invention may be employed to measure conductive or non-conductive surfaces. In the case of non-conductive surfaces a suitable calibration operation (relating inter-electrode capacitance to probe-surface distance) will be required to take account of the dielectric constant of the surface.

Examples of the invention will now be described in more detail, with reference to the accompanying drawing in which.

FIG. 1b is an end view of the stylus of FIG. 1a;

FIG. 1c is a circuit diagram for the probe of FIG. 1a;

FIG. 2b is an end view of the stylus of FIG. 2a;

FIG. 2c is a circuit diagram for the probe of FIG. 2a;

FIG. 3a is a sectional elevation of part of a stylus of a probe in accordance with another embodiment of the invention;

FIG. 3b is an end view of the stylus of FIG. 3a;

FIG. 3c is a circuit diagram for the probe of FIG. 3a;

FIG. 4b is an end view of the stylus of FIG. 4a;

FIG. 4c is a circuit diagram for the probe of FIG. 4a;

FIG. 5 is an end view of an alternative arrangement of the electrode for the probe of FIG. 4a;

Figure 1A:
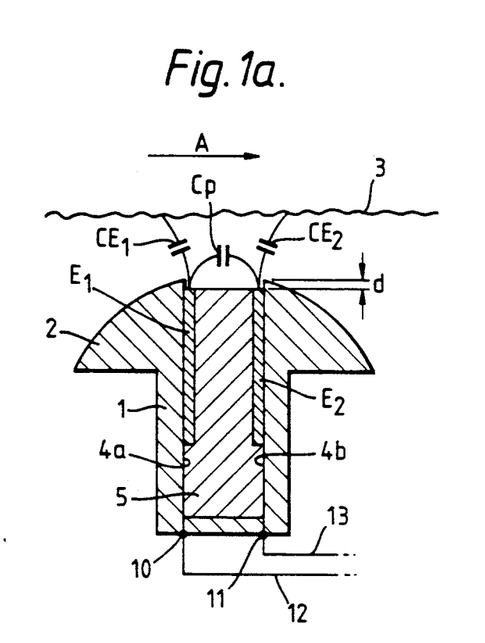
FIG. 1a is a sectional elevation through part of a stylus of a probe in accordance with one embodiment of the invention.
Figure 1B:
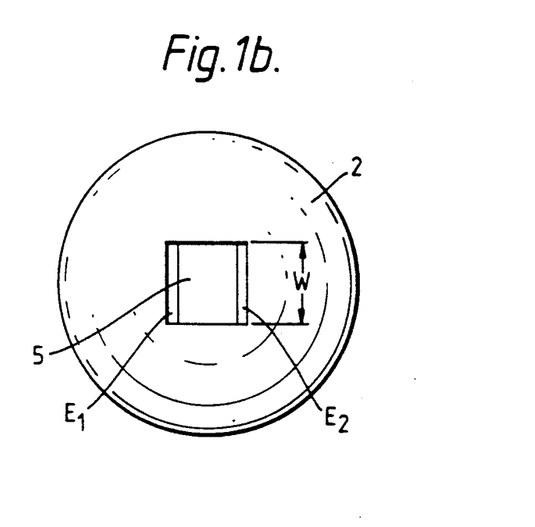

Referring now to FIG. 1a there is shown a stylus 1 for a capacitance sensing probe of the present invention. The stylus takes the form of a skid made of insulating material and having a rounded end 2 for contacting the surface 3 of an electrically conducting workpiece. The stylus is made in two parts held together and defining a central aperture 4 of rectangular cross section, (in this embodiment illustrated as square see FIG. 1b). On the internal surfaces 4a, 4b of the aperture are formed electrodes $E_1$ and $E_2$ which are separated by an insulating medium 5.

Figure 1C:
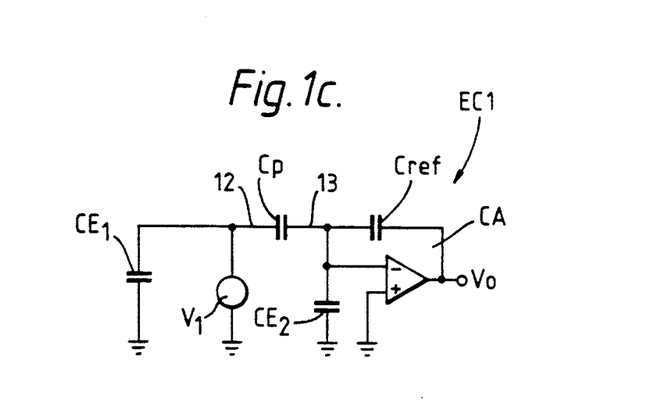

The tips of the electrodes are recessed within the end of the aperture by a depth d so that they will remain at a fixed distance from the surface 3 as the skid moves over the surface in contact therewith. Electrical connections are made from the electrodes to terminals 10 and 11 which are connected by wires 12 and 13 to an electrical circuit (FIG. 1c).

It is to be understood that the stylus described is mounted on a probe in such a position that the electrodes are normal to the surface with the edges of the electrodes in close proximity to the surface and lying parallel to the surface.

The probe measures the capacitance between the two plates, which is affected by the distance of the surface from the ends of the plates.

There are three capacitances formed by this probe/workpiece combination. Firstly there is the capacitance between the two electrodes $E_1$ and $E_2$ referenced Cp. Then there are the two capacitances between the plates $E_1$, $E_2$ and the surface of the workpiece 3 referenced $C_{E1}$ and $C_{E2}$ respectively. The probe circuit is designed to detect the effect of the surface on the capacitance Cp. The workpiece is assumed in this embodiment (and all subsequent ones) to be earthed, but the circuit diagrams hold good as long as the capacitance from the workpiece to ground is high compared to the probe capacitance Cp.

Depending on the distance between the plates the probe can be made to measure either an average surface roughness, or the profile of the surface. For example, in order to be able to measure surface profile, i.e. the distances of the individual peaks and troughs from the ends of the electrodes, the total thickness of the two electrodes and the intermediate dielectric (insulator) should be of the order of 0.1 to 10 microns. To achieve this the electrode and the dielectric and the electrical connections are deposited onto the surfaces 4a, 4b of the stylus in very thin layers by vapour deposition or sputtering to form very thin plate-like electrodes.

To measure an average surface roughness (i.e. the average distance of the peaks and troughs of the surface over an area) the electrode spacing may be in the range 0.1 to 10 mm.

A circuit diagram EC1 for producing signals from the probe is shown in FIG. 1c. Wires 12 and 13 are connected from the terminals 10 and 11 to a voltage source $V_1$ and a charge amplifier CA. The charge amplifier CA includes a feed back capacitance C ref. This arrangement produces an output $V_o = -Cp/C\text{ ref} \times V_1$ where Cp is the capacitance of the probe.

In operation the probe may be mounted on a machine capable of movement in three orthogonal directions X, Y and Z to provide an automatic scanning system. The probe is moved downwards in the Z direction until the skid contacts the surface, after which the probe is moved across the surface in a direction normal to the width W of the electrodes as shown by the arrow A in FIG. 1a.

Where the probe is designed for surface profile measurements the skid will follow any relatively large surface contours i.e. low spatial frequency variations in surface height, and the probe will therefore detect only the relatively high frequency variation.

To avoid damage to the stylus it may be mounted on a crash protection device. Such devices are known for mounting styli from our U.S. Pat. Specification No. 4,153,998.

Alternatively the stylus may be mounted on an analogue probe head which will allow small movement in the three coordinate directions X, Y and Z, and provide a feed back signal to the machine to move the probe in any of the three directions, to enable the probe to follow contours of the workpiece.

Figure 2A:
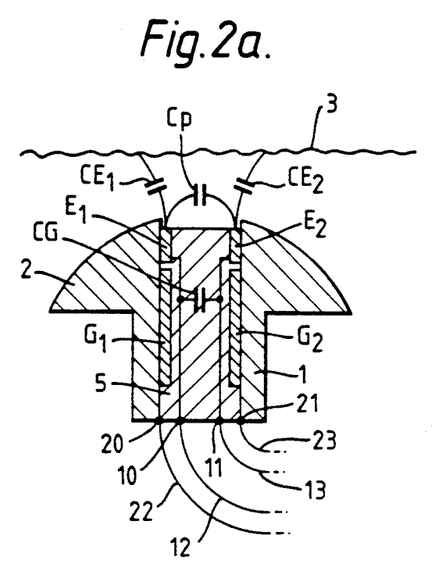
FIG. 2a is a sectional elevation through part of a stylus of a probe in accordance with another embodiment of the invention.
Figure 2B:
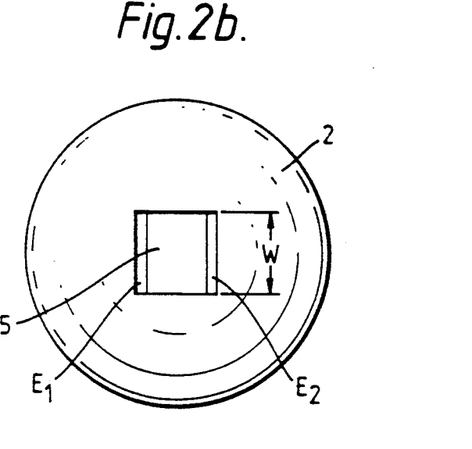
Figure 2C:
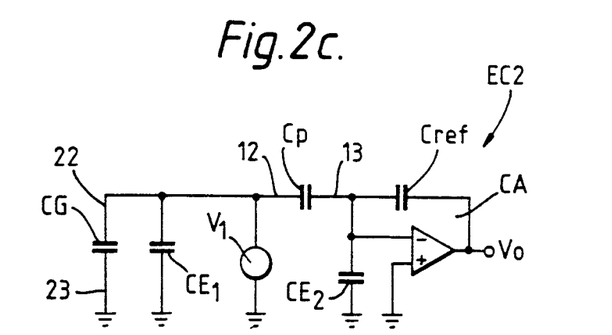

Referring now to FIGS. 2a and 2c there is shown an embodiment of the invention in which the electrodes of the probe are guarded to reduce the component of Cp provided by the internal capacitance directly between the plates within the stylus.

The probe is constructed in similar manner to that described with reference to FIG. 1a and the same structural features are given the same reference numerals. The probe has a stylus 1 which terminates in a rounded skid 2. Two electrodes $E_1$ and $E_2$ are formed on the internal surfaces of two parts of the stylus and are separated by a layer of insulation 5. The two electrodes are recessed a distance d from the outer surface of the skid. Two guard electrodes $G_1$, $G_2$ are provided in this embodiment, which are disposed within the aperture and are insulated from the electrodes $E_1$ and $E_2$. Electrical connections are made from the electrodes $G_1$ and $G_2$ to additional terminals 20 and 21. The diagram of the circuit EC2 for this embodiment is similar to that for the embodiment shown in FIG. 1c with the addition that the capacitor $C_G$ formed between the guard electrodes $G_1$ and $G_2$ is connected by wire 22 on one side to the voltage $V_1$ and by wire 23 on the other side to earth. The output $V_o = -Cp/C\text{ Ref} \times V_1$.

Figures 3A, 3B, 3C:
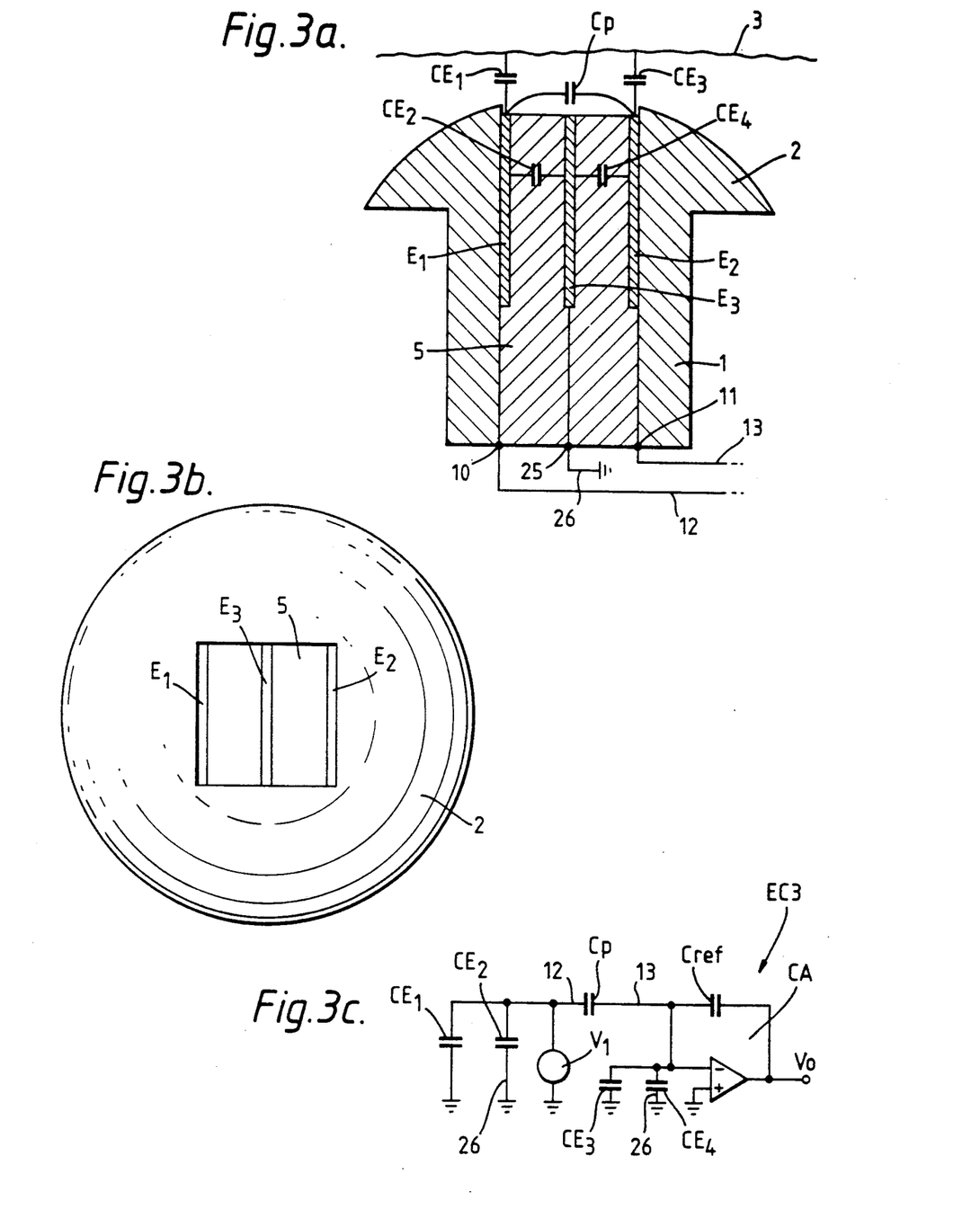

Referring now to FIG. 3a to 3c there is shown a probe stylus 1 having a rounded end 2 to provide a skid, having a pair of electrodes $E_1$ and $E_2$ separated by a layer of insulation 5. In this embodiment however, a third, electrode $E_3$ is provided down the centre of the stylus. This electrode $E_3$ is connected to an additional terminal 25 which is connected to earth via a wire 26. In this embodiment there are five capacitors formed. These are the capacitances between each of the electrodes $E_1$ and $E_2$ and the workpiece surface 3, reference $C_{E1}$ and $C_{E3}$, the capacitances between the electrodes $E_1$ and $E_2$ and the central, earthed electrode $E_3$ indicated respectively by the references $C_{E2}$ and $C_{E4}$, and the capacitance between the two electrodes $E_1$ and $E_2$ which is indicated by the reference $Cp$.

The circuit diagram EC3 shown in FIG. 3c shows how the connections are made to a charge amplifier CA and a driving voltage $V_1$. The output $V_o$ from the charge amplifier in this embodiment is equal to $-Cp/C$ ref x $V_1$.

Figure 4A:
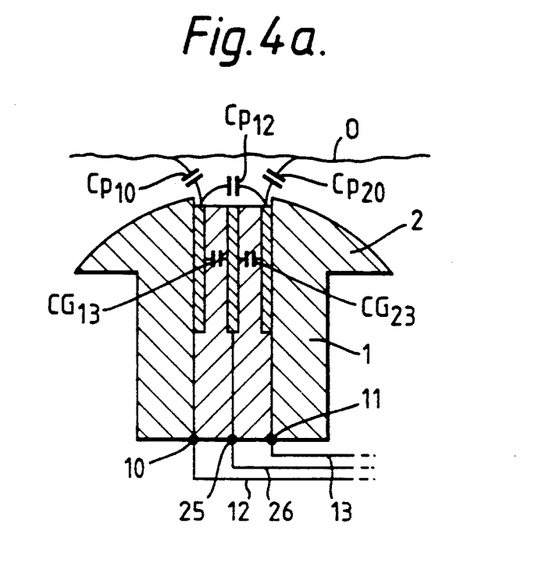
FIG. 4a is a sectional elevation of part of a stylus for a probe in accordance with a further embodiment of the invention.
Figure 4B:
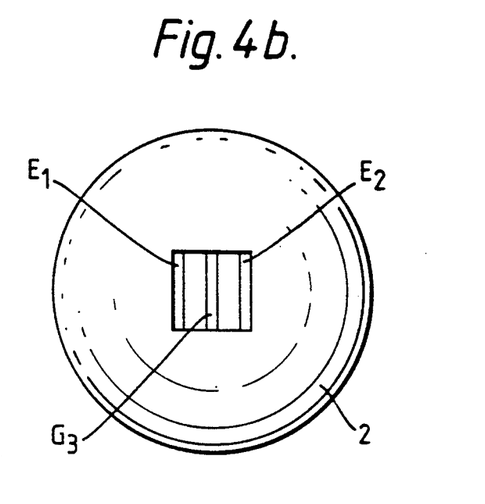
Figure 4C:
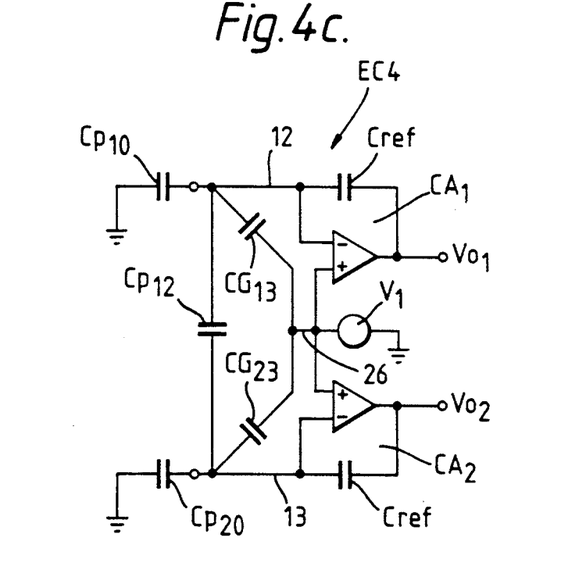

Referring now to FIGS. 4a to 4c there is shown a further embodiment similar to that shown in FIGS. 3a to 3c.

The stylus once again has a rounded skid 2 and a pair of electrodes $E_1$ and $E_2$ but in this case the central electrode is driven by the voltage $V_1$ via wire 26 and acts as a guard electrode reference $G_3$. The capacitances to be considered in this embodiment are the capacitances between each of the electrodes $E_1$ and $E_2$ and the workpiece surface $Cp_{10}$ and $Cp_{20}$, the capacitance between the two electrodes $E_1$ and $E_2$, reference $Cp_{12}$ and the capacitances between the electrodes $E_1$ and $G_3$, and $E_2$ and $G_3$ referenced $C_{G13}$ and $C_{G23}$ respectively. The reference 0 indicates the potential of the workpiece surface.

Once again the circuit diagram EC4 shows how these capacitors are arranged with the driving voltage $V_1$ and two charge amplifiers $CA_1$ and $CA_2$ to provide outputs $V_o = V_1 (1 + Cp_{10}/C\ ref)$ and $V_{o2} = V_1 (1 + Cp_{20}/C\ ref)$ The advantage of this embodiment is that it can sense slopes of a workpiece surface at right angles to the width of the electrodes since the distances between the two plates and the surface in such circumstances will be different and the fringe-field capacitances will be affected differently.

Clearly the numbers of electrodes and guard electrodes can be varied almost at will to provide probes with a variety of capabilities.

Figure 5:
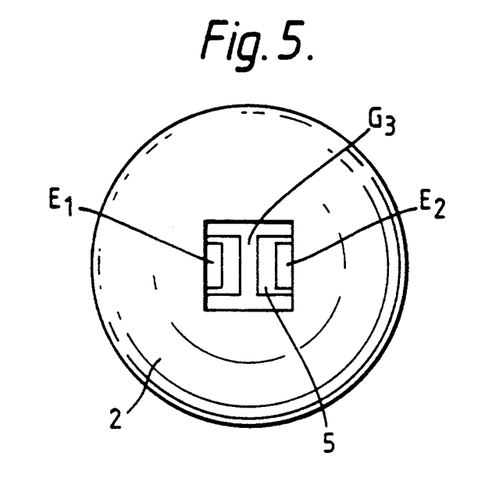
Figure 6:
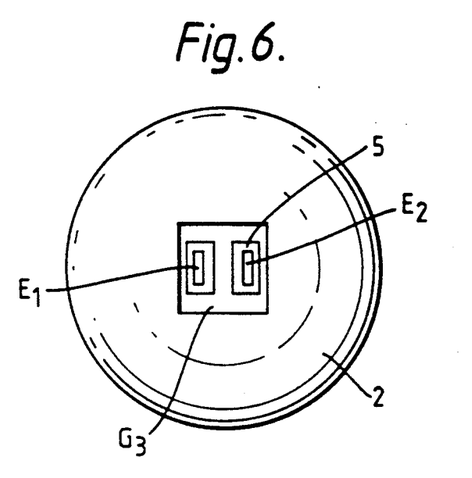
FIG. 6 is another alternative arrangement of the electrode for the probe of FIG. 4.

FIG. 5 shows an end view of a probe stylus in which the central guard electrode $G_3$ is in the shape of an I-section FIG. 6 shows a probe stylus arrangement in which the guard electrode $G_3$ completely surrounds the two electrodes $E_1$ and $E_2$ and is insulated from both by insulation 5.

Figure 7:
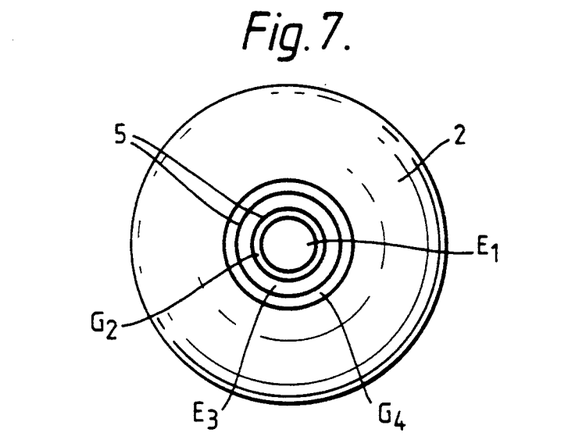
FIG. 7 is another alternative arrangement of the electrodes for the probe of FIG. 4.

An arrangement of concentric electrodes is shown in FIG. 7 in which a cylindrical central electrode $E_1$ is surrounded by and insulated from a guard electrode $G_2$ which in turn is surrounded by and insulated from an electrode $E_3$, which again is surrounded by and insulated from a second guard electrode $G_4$. This electrode may be the external surface of the stylus or it may have a thin layer of insulation around it for handling purposes. All of the insulation is referenced 5.

Modifications may need to be made to the electrical circuits to accommodate the variations.

Figure 8:
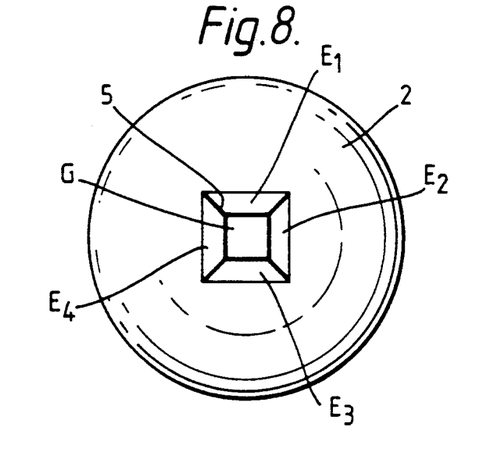
FIG. 8 is an end view of a stylus for another probe according to the invention showing yet another arrangement of electrode.

FIG. 8 shows a further modification which produces a probe capable of detecting surface slopes in two orthogonal directions. In this modification the stylus has a central square guard electrode G surrounded by four electrodes $E_1$ to $E_4$ one on each face. The electrical circuit for this arrangement will include two of the electrical circuits shown in FIG. $4_c$.

Figure 9:
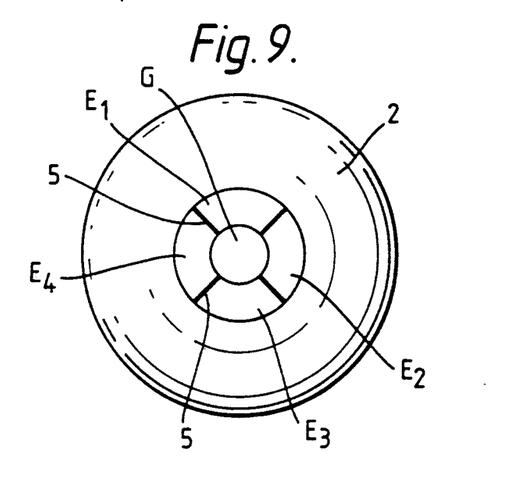
FIG. 9 is an end view of a stylus for another probe according to the invention showing yet another arrangement of electrodes.

FIG. 9 shows an adaptation of FIG. 8 in which the guard electrode G is concentric with and surrounded by four arcuate electrodes $E_1$, $E_2$, $E_3$ and $E_4$.

Figure 10:
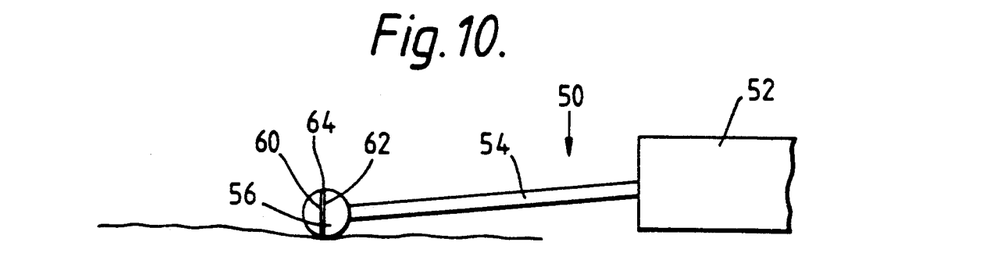
FIG. 10 is an elevation of another embodiment of a probe according to the invention.

Referring now to FIG. 10 a probe 50 is shown having a body 52 which contains at least some of the capacitance-determining electrical circuitry, and a ball-ended stylus 54. Within the ball 56 of the stylus 54 are formed two thin circular electrodes 60, 62 which are spaced apart by insulating material 64 in the direction of the longitudinal axis of the stylus.

The electrodes are made the same diameter as the ball 56, or very slightly smaller, so that the edges thereof are either flush with, or slightly recessed within the ball. The ball thus acts as a skid which during a measurement process is pulled over the surface in contact therewith, and with the edges of the electrodes normal to the surface.

As can be seen from the FIG. this probe is intended to be moved over the surface horizontally and the stylus is relatively long and flexible to prevent large forces acting on the ball causing damage thereto.

As with the other embodiments described above the electrical circuitry associated with the electrodes is arranged to determine the effect of the surface on the fringe field of the capacitance between the two electrodes. In addition, in order to determine more information about the surface, the effect of the surface on the fringe field capacitance between each of the electrodes and the surface may also be measured.

Figure 11:
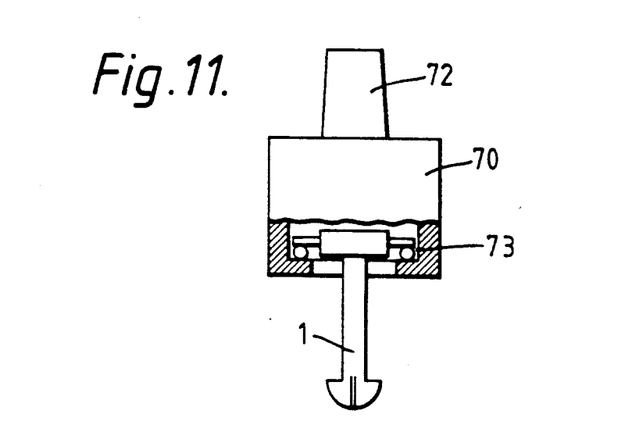
FIG. 11 shows diagrammatically a probe for mounting a stylus of the present invention vertically.

FIG. 11 shows diagrammatically a probe for mounting a stylus vertically for performing the measuring operations described with reference to FIGS. 1 to 4. The probe has a body 70 in which at least some of the electrical circuitry may be contained. The body 70 has a shank 72 for attachment to a machine for moving the probe. The stylus 1 projects downwardly from a kinematic support 73 (known per se) which allows tilting and vertical displacement of the stylus in the event of large forces acting thereon.

Figure 12:
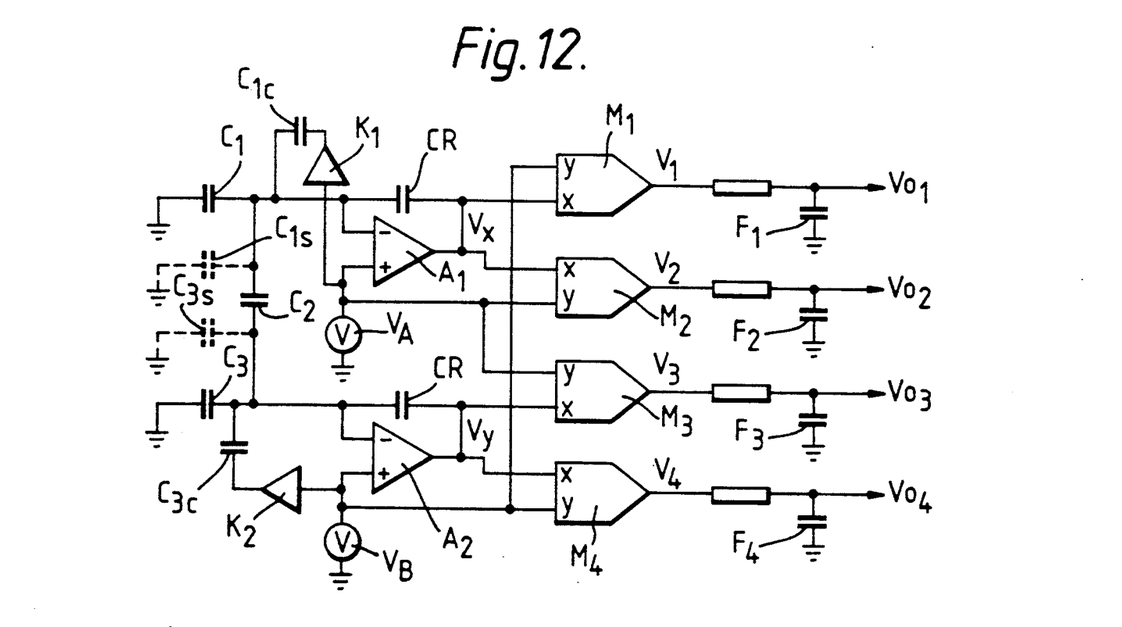
FIG. 12 is a further electric circuit diagram showing a circuit for determining the value of a plurality of capacitances.

Referring now to FIG. 12 there is shown an electrical circuit which may be used to determine three capacitances $C_1$, $C_2$, and $C_3$ in a network. These capacitances may, for example, be the capacitances $CE_1$ and $CE_2$ shown in FIG. 2a between electrodes $E_1$ and $E_2$ and the surface (designated $C_1$ and $C_3$ in FIG. 12) and the capacitance $C_p$ shown in FIG. 2a between the electrodes (designated $C_2$ in FIG. 12).

Also shown in the Figure are compensating capacitances $C_{1c}$ and $C_{3c}$ which are introduced to compensate for internal stray capacitances and the free space capacitance value inherent in all capacitors. The compensation is used to zero the free space and stray capacitances so that capacitance changes seen by the probe are solely due to the effects of the proximity of the surface on the electrodes. The compensation capacitances can also be used to simplify the derivation of the outputs and to zero the system in free space against its internal capacitance drifts. The compensation capacitances are attached to the non-grounded nodes of the circuit and are driven by voltages derived from the exciting voltages. The values of the compensation capacitances should be chosen to be of the same order as the capacitances to be compensated which are derived by calibration.

The circuit is driven by two voltages $V_A = V\cos\omega_1 t$ and $V_B = V\cos\omega_2 t$ and uses two charge amplifiers $A_1$ and $A_2$ to produce outputs $V_x$ and $V_y$.

$$V_x = -V_B \frac{C_2}{C_R} + V_A \frac{(C_1 + C_{1S} + C_{1C} + C_R + C_2)}{C_R} -$$

$$K_1 V_A \frac{C_{1C}}{C_R}$$

-continued
$$V_y = -V_A \frac{C_2}{C_R} + V_B \frac{(C_3 + C_{3S} + C_{3C} + C_R + C_2)}{C_R} -$$

$$K_2 V_B \frac{C_{3C}}{C_R}$$

To compensate for the stray capacitances $C_{1S}$, $C_{3S}$, $K_1$, $K_2$ are adjusted such that $$K_1 V_A \frac{C_{1C}}{C_R} = V_A \frac{(C_{1S} + C_{1C} + C_R)}{C_R}$$

$$K_2 V_B \frac{C_{3C}}{C_R} = V_B \frac{(C_{3S} + C_{3C} + C_R)}{C_R}$$

Hence by substitution $$V_x = -V_B \frac{C_2}{C_R} + V_A \frac{(C_1 + C_2)}{C_R}$$

$$V_y = -V_A \frac{C_2}{C_R} + V_B \frac{(C_3 + C_2)}{C_R}$$

These outputs are passed to multipliers $M_1$, $M_2$, $M_3$ and $M_4$ to produce outputs $$V_1 = \frac{V_B V_x}{K}, V_2 = \frac{V_X V_A}{K}, V_3 = \frac{V_Y V_A}{K} \text{ and } V_4 = \frac{V_Y V_B}{K}$$

where K is the multiplier constant.

Expanding, for example $V_1$, by substitution of $V_x$ $$V_1 = \frac{-V_B^2}{K} \frac{C_2}{C_R} + \frac{V_A V_B}{K} \frac{(C_1 + C_2)}{C_R}$$

Substituting for $V_A$, $V_B$ $$V_1 = \frac{-V^2}{K} (\cos\omega_1 t)^2 \frac{C_2}{C_R} + \frac{V^2}{K} \frac{(C_1 + C_2)}{C_R} \cos\omega_1 t \cos\omega_2 t$$

Re-arranging the cosine terms $$V_1 = \frac{-V^2}{2K} (1 + \cos 2\omega_1 t) \frac{C_2}{C_R} +$$

$$\frac{V^2}{2K} \frac{(C_1 + C_2)}{C_R} (\cos(\omega_1 + \omega_2)t + \cos(\omega_1 - \omega_2)t)$$

The only DC term present is:

$$\frac{-V^2}{2K} \frac{C_2}{C_R}$$

Similarly for outputs $V_2$ to $V_4$

The four outputs $V_1$, $V_2$, $V_3$ and $V_4$ are filtered by low pass filters $F_1$, $F_2$, $F_3$ and $F_4$ to produce outputs $$V_{01} = \frac{-V^2}{2K} \frac{C_2}{C_R}, V_{02} = \frac{V^2}{2K} \frac{(C_1 + C_2)}{C_R},$$

$$V_{03} = \frac{-V^2}{2K} \frac{C_2}{C_R} \text{ and } V_{04} = \frac{V^2}{2K} \frac{(C_3 + C_2)}{C_R}$$

and the values of $C_1$, $C_2$, $C_3$ and be shown to be $$C_2 = -V_{01} \frac{2K}{V^2} C_R$$

$$C_1 = (V_{02} + V_{01}) \frac{2K}{V^2} C_R$$

$$C_3 = (V_{04} + V_{01}) \frac{2K}{V^2} C_R$$

The additional capacitances $C_{1S}$ and $C_{3S}$ may be included in the circuit to take account of stray capacitance, not part of the probe, for example stray capacitances in the amplifier inputs. The compensation of $C_{1S}$, $C_{3S}$ may be carried out by adjusting $C_{1C}$, $C_{3C}$ and/or $K_1$, $K_2$. This adjustment would normally be carried out by manually or automatically adjusting the sensed value of $C_1$, $C_3$ to zero while the probe was in free space.

The above circuit can be expanded to enable additional capacitances to be calculated where additional electrodes are added to the probe.

The probes of the present invention may be used to take measurements of surface features on both conducive and non-conductive surfaces.

We claim:

1. A probe for measuring a surface roughness profile of a surface of a body along a measurement direction across the surface, the probe comprising;
   a pair of electrodes; and
   an electric circuit comprising means for determining the effect of the surface on a capacitance between the pair of electrodes as the probe is moved over the surface, wherein the pair of electrodes comprise thin plates mounted confronting each other in a spaced apart relationship, surface planes of the pair of electrodes being parallel to each other and substantially normal to the surface as the probe is moved a layer of electrical insulating material being provided between the pair of electrodes, and a total distance across the two electrodes including the insulating material therebetween being in the range of 0.1 to 10 microns.

2. The probe of claim 1, wherein each electrode of the pair of the electrodes is formed as a layer on a substrate by a deposition process.

3. The probe of claim 1, wherein the electrical circuit further comprises means for determining an effect of the surface on capacitances between each one of the pair of electrodes and the surface.

4. The probe of claim 1, wherein the probe comprises a rounded skid within which the pair of electrodes are mounted, edges of the pair of electrodes positioned adjacent to but spaced a small fixed distance from a surface of the skid.

5. The probe of claim 1, wherein the probe comprises a probe body, and a stylus protruding from the probe body, sad stylus having a longitudinal axis and terminating in a ball, the pair of electrodes comprising a pair of circular disk-shaped electrodes mounted adjacent a diameter of the ball, the pair of circular disk-shaped electrodes being substantially normal to and spaced apart along the direction of the longitudinal axis of the stylus.

6. A method for measuring a surface roughness profile of a body using a probe, the probe comprising an electrical circuit, a pair of thin plate electrodes and an electrical insulating material provided between the pair of thin plate electrodes, the total distance between the pair of thin plate electrodes in a measurement direction being in a range of 0.1 microns to 10 microns, the method comprising the steps of:

orienting the probe so that surface planes of the pair of thin plate electrodes are substantially normal to the surface and edges of the pair of thin plate electrodes are substantially parallel to the surface;

bringing the probe into close proximity to the surface;

moving the probe over the surface in a direction substantially normal to the surface planes of the pair of thin plate electrodes while measuring a capacitance between the pair of thin plate electrodes; and determining a distance between the pair of thin plate electrodes and the surface of the body in response to the measured capacitance.

7. The method of claim 6, further comprising the step of simultaneously measuring a capacitance between each electrode and the surface.

8. A probe for measuring a surface roughness profile of a surface of a body along a measurement direction across the surface, the probe comprising:

at least three electrodes; and an electric circuit comprising means for determining the effect of the surface on capacitances between each pair of adjacent electrodes as the probe is moved over the surface, wherein the at least three electrodes comprise at least three thin plates positioned in the probe in a spaced apart relationship, surface planes of the at least three thin plates being parallel to each other and substantially normal to the surface as the probe is moved; and a layer of electrical insulating material provided between each pair of adjacent electrodes, such that a total distance across each pair of electrodes is in a range of 0.1 micron to 10 microns.

* * * * *